United States Patent
Haider

(10) Patent No.: US 7,441,132 B2
(45) Date of Patent: *Oct. 21, 2008

(54) CIRCUIT FOR ENABLING DUAL MODE SAFE POWER-ON SEQUENCING

(75) Inventor: Nazar Syed Haider, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 11/261,151

(22) Filed: Oct. 27, 2005

(65) Prior Publication Data

US 2006/0036886 A1    Feb. 16, 2006

Related U.S. Application Data

(63) Continuation of application No. 10/256,802, filed on Sep. 26, 2002, now Pat. No. 7,013,396.

(51) Int. Cl.
*G06F 1/00* (2006.01)
*G01F 1/26* (2006.01)

(52) U.S. Cl. .................. 713/300; 713/310; 713/320; 713/330; 713/340

(58) Field of Classification Search .................. 713/300
See application file for complete search history.

(56) References Cited

U.S. PATENT DOCUMENTS 4,843,224 A * 6/1989 Ohta et al. .................. 235/487
6,424,128 B1 * 7/2002 Hiraki et al. ................ 323/268

OTHER PUBLICATIONS

IEEE 100: The Authoritative Dictionary of IEEE Standards Terms, 2000, IEEE, 7th Edition, p. 872.*

* cited by examiner

*Primary Examiner*—Rehana Perveen
*Assistant Examiner*—Stefan Stoynov
(74) *Attorney, Agent, or Firm*—David L. Guglielmi

(57) ABSTRACT

A circuit that enables a safe power-on sequencing is described. The circuit enables a processor to be powered by an internal or external voltage source. The circuit detects for the presence of an external voltage regulator. If an external voltage generator is not providing a valid voltage source to the processor, the circuit enables an internal voltage regulator to provide a stable voltage source.

10 Claims, 5 Drawing Sheets

CIRCUIT FOR ENABLING DUAL MODE SAFE POWER-ON SEQUENCING

CLAIM OF PRIORITY

This application is a continuation of and claims priority to U.S. patent application Ser. No. 10/256,802 filed on Sep. 26, 2002 now U.S. Pat. No. 7,013,396 entitled "A Circuit for Enabling Dual Safe Mode Power-On Sequencing," which is incorporated herein by reference in its entirety.

FIELD OF THE INVENTION

The present invention pertains to the field of integrated circuit design. More particularly, the present invention relates to a circuit that enables a safe power-on sequencing for a system that is capable of utilizing both an internal and an external voltage regulator.

BACKGROUND OF THE INVENTION

A voltage regulator is typically used to provide a power source to an integrated circuit (IC). Depending on the functionality of the IC, some components of the IC may require a dedicated voltage regulator. For example, circuits such as phase locked loops (PLL) are sensitive to noise in certain frequency bands and thus require an isolated voltage regulator to minimize noise from other circuits.

FIG. 1A depicts one example of a system having a processor 100 with an isolated voltage regulator 110. The processor power supply 105 delivers power to the processor 100. The external voltage regulator 110 provides a dedicated voltage source to a PLL 120 on the processor chip 100. The external voltage regulator 110 is located on a motherboard and is coupled to the PLL 120 through pins 115 and 116 on the processor chip 100. The external voltage regulator 110 is also coupled to a noise filter comprising inductor 130 and capacitor 140 to isolate noise generated by the external voltage regulator 110 from the processor 100. The inductor 130 and capacitor 140 are located on the motherboard.

Alternatively, a voltage regulator may be placed internal to the processor such as in FIG. 1B. The internal voltage regulator 150 is located on the same processor die 170 as the PLL 160. Processor power supply 175 delivers power to the processor 170. The internal voltage regulator 150 generates power for the PLL 160. While the system of FIG. 1B may help reduce costs by removing the need for packaging pins and noise filters associated with an external voltage regulator, the system of FIG. 1B is incompatible with the one shown in FIG. 1A.

BRIEF DESCRIPTION OF THE DRAWINGS

The embodiments of the present invention are illustrated by way of example and not in the figures of the accompanying drawings, in which like references indicate similar elements and in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Internal voltage regulators may be used to supply power to a noise sensitive component on a processor chip. While an internal voltage regulator may help to reduce costs, some motherboards may still be configured for use with an external voltage regulator. Thus, a system that is compatible with both an internal voltage regulator and an external voltage regulator would provide a robust solution.

Figure 1A:
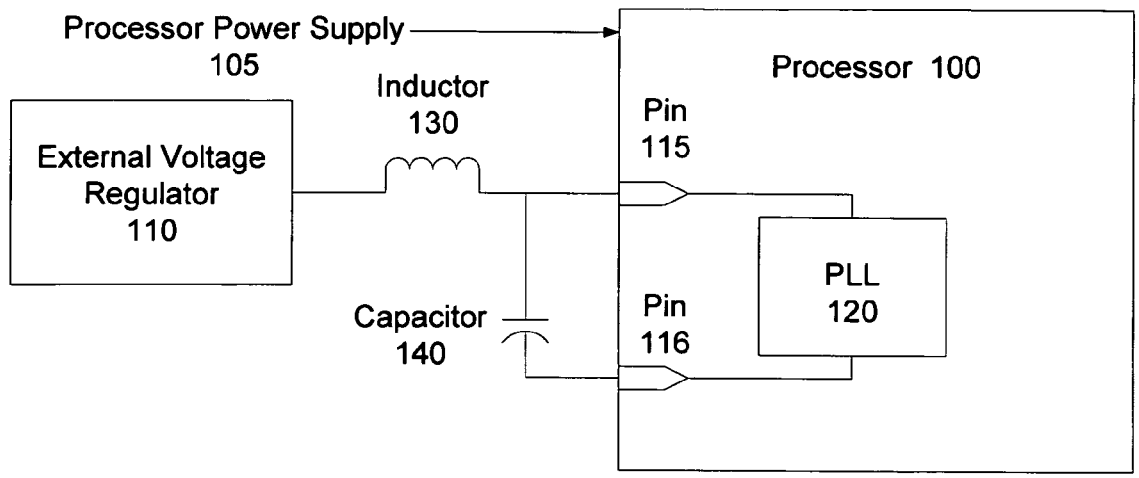
FIG. 1A is a prior art system having an external voltage regulator.
Figure 1B:
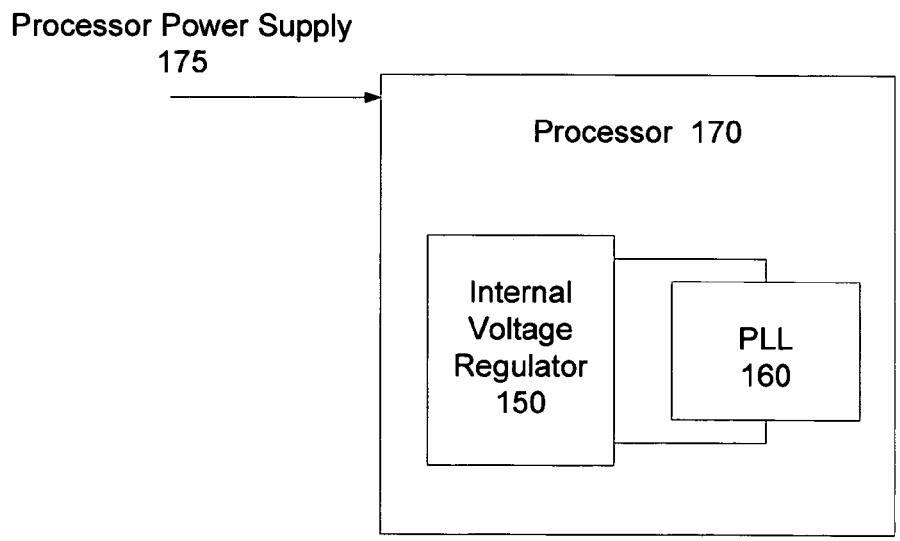
FIG. 1B is a prior art system having an internal voltage regulator.
Figure 2:
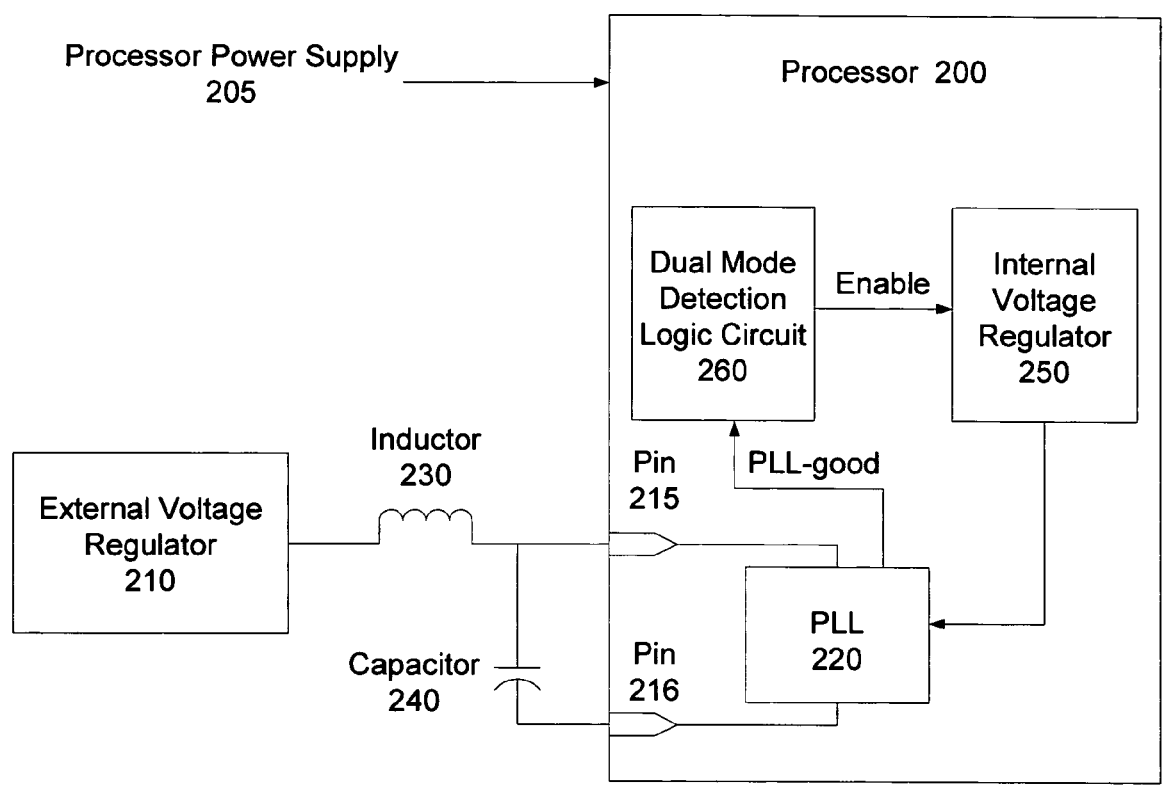
FIG. 2 is one embodiment of a system that is compatible with both an internal voltage regulator and an external voltage regulator.
Figure 3:
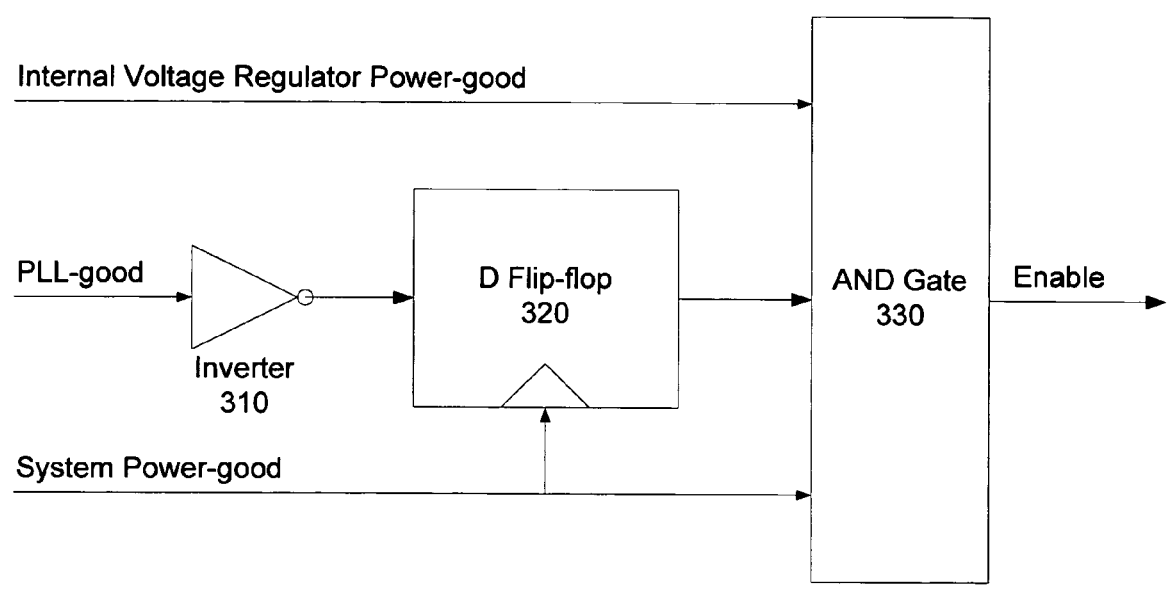
FIG. 3 is one embodiment of a dual mode detection logic circuit.

FIG. 2 depicts a system that permits operation with an internal voltage regulator or an external voltage regulator. The internal regulator or the external regulator may provide power to a circuit of the processor chip 200. The processor chip 200 itself is powered by a processor power supply 205. External regulator 210 is coupled to the processor chip 200 through pins 215 and 216. Depending on the packaging technology, packaging bumps may be implemented in place of the pins 215 and 216. The external regulator 210 may be located on a motherboard. A noise filter comprising inductor 230 and capacitor 240 is coupled to the external regulator 210 to isolate noise generated by the external voltage regulator 210 from the processor 200. Inductor 230 and capacitor 240 may be discrete components located on the motherboard. The processor chip 200 comprises a PLL 220 coupled to an internal voltage regulator 250. Thus, the internal voltage regulator 250 is located on the same processor die as the PLL 220. In addition, a dual mode detection logic circuit 260 such as shown in FIG. 3 is coupled to the PLL 220 and the internal voltage regulator 250. For this embodiment of the invention, the dual mode detection logic circuit 260 is responsible for enabling the internal voltage regulator 250.

At system power-up, the dual mode detection logic circuit 260 monitors packaging pins 215 and 216, which are coupled to an external voltage regulator 210. If a voltage source is detected at any given packaging pin, the dual mode detection circuit 260 disables the internal voltage regulator 250 because the external voltage regulator 210 is already providing power to the PLL 220. The internal voltage regulator 250 may be disabled using an enable control signal.

However, if power is not sensed at a packaging pin, the dual mode detection circuit 260 enables the internal voltage regulator 250. Examples of systems that do not supply power to the PLL 220 via the packaging pins 215 and 216 include a system where there is no external voltage regulator or a system where noise filters are excluded to save costs.

For another embodiment of the invention, the dual mode detection logic circuit 260 ensures that the internal voltage regulator 250 and the system are adequately powered before enabling the internal voltage regulator 250. For example, the system may generate a power-good signal after the system is completely powered. This power-good signal is asserted only after the system has completed an internal check confirming that power-up was successful. Thus, a circuit such as the one depicted in FIG. 3 may be used to generate an enable signal for the internal voltage regulator 250 that is dependent upon this power-good signal.

The dual mode detection logic circuit 260 of FIG. 3 comprises an inverter 310, a D flip-flop 320, and an AND gate 330. The D flip-flop 320 is clocked by the power-good signal and receives an inverted PLL-good signal at its data input. The PLL-good signal may be generated by the PLL 220. The PLL-good signal is asserted if the PLL 220 detects that an external voltage regulator 210 is providing a valid voltage source for the PLL 220. The PLL-good signal is inverted by an inverter 310 before being connected to the D-flip flop 320. The output of the D flip-flop 320 is then coupled to the AND gate 330. Therefore, the output of the D flip-flop 320 is not asserted unless the PLL-good signal is deasserted and the system power-good signal is asserted.

The enable signal is generated by the AND gate 330. The inputs of the AND gate 330 are the output of the D flip-flop 320, the system power-good signal, and an internal voltage regulator power-good signal. In order for the internal voltage regulator 250 to function properly, the internal voltage regulator 250 requires a voltage source. For example, the internal voltage regulator 250 may require a 1.5 volts source. The dual mode detection logic circuit 260 may receive the same voltage source as an input and generate an internal voltage regulator power-good signal if a valid voltage source is detected. Therefore, for this embodiment of the invention, the AND gate 330 does not generate an active high enable signal for the internal voltage regulator 250 unless the internal voltage regulator 250 has adequate power, the system is powered, and the PLL 220 is not receiving power from an external voltage regulator 210.

Figure 4:
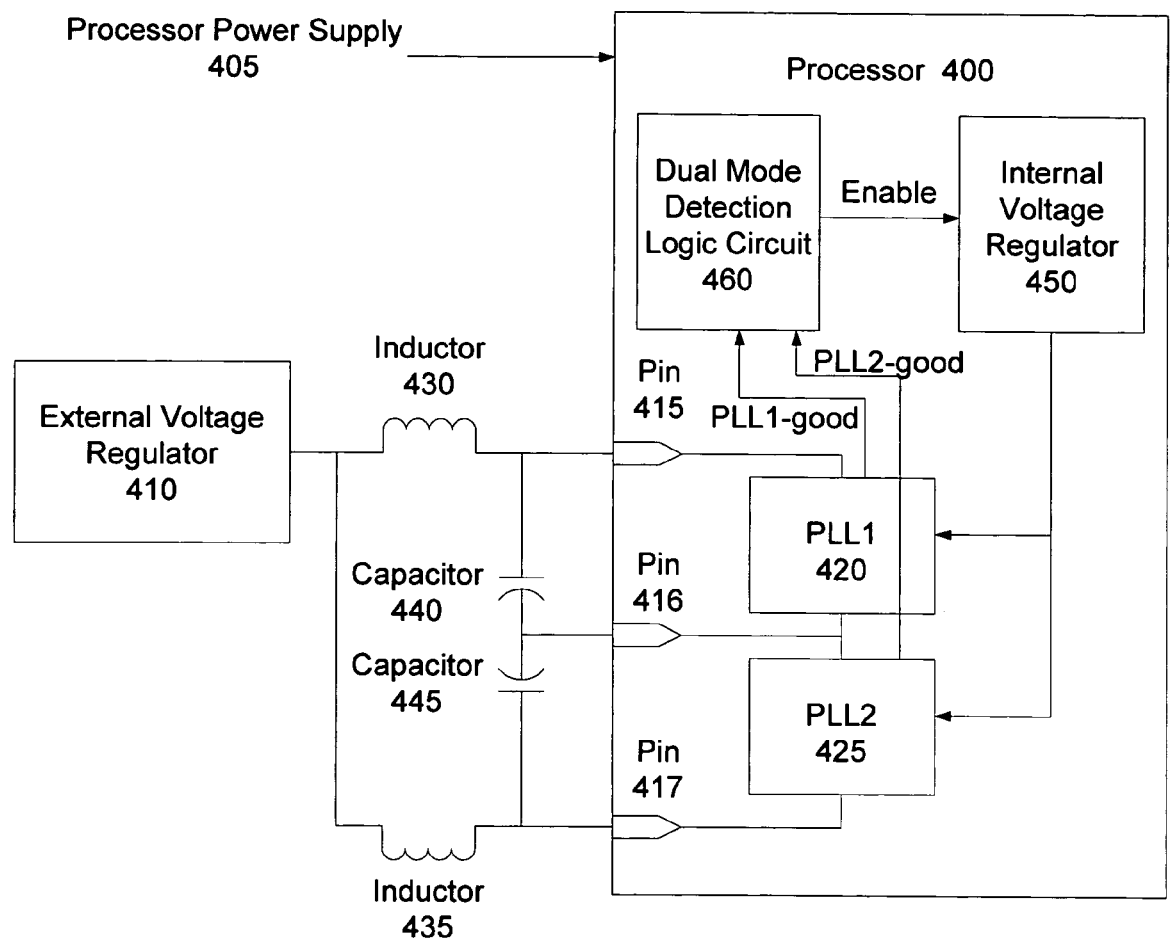
FIG. 4 is another embodiment of a system that is compatible with both an internal voltage regulator and an external voltage regulator.

For another embodiment of the invention, FIG. 4 depicts a system having a first PLL (PLL1) 420 and a second PLL (PLL2) 425 on the processor chip 400. The processor power supply 405 delivers power to the processor chip 400. PLL1 420 may generate a clock for the processor core, while PLL2 425 may generate a clock for an input/output (I/O) bus. The system, however, is not limited to a processor 400 having only two PLL's. PLL1 420 and PLL2 425 are coupled to a dual mode detection logic circuit 460, an internal voltage regulator 450, and packaging pins 415-417. The pins 415-417 are coupled to inductors 430 and 435, capacitors 440 and 445, and an external voltage regulator 410.

If the external voltage regulator 410 generates a voltage source and the PLL1 420 detects a valid voltage source at pin 415, PLL1 420 generates a PLL1-good signal. Similarly, if PLL2 425 detects a valid voltage source at pin 417, PLL2 425 generates a PLL2-good signal. The PLL1-good and PLL2-good signals are coupled to the dual mode detection logic circuit 460. An example of the dual mode detection logic circuit 460 is depicted in FIG. 5.

Figure 5:
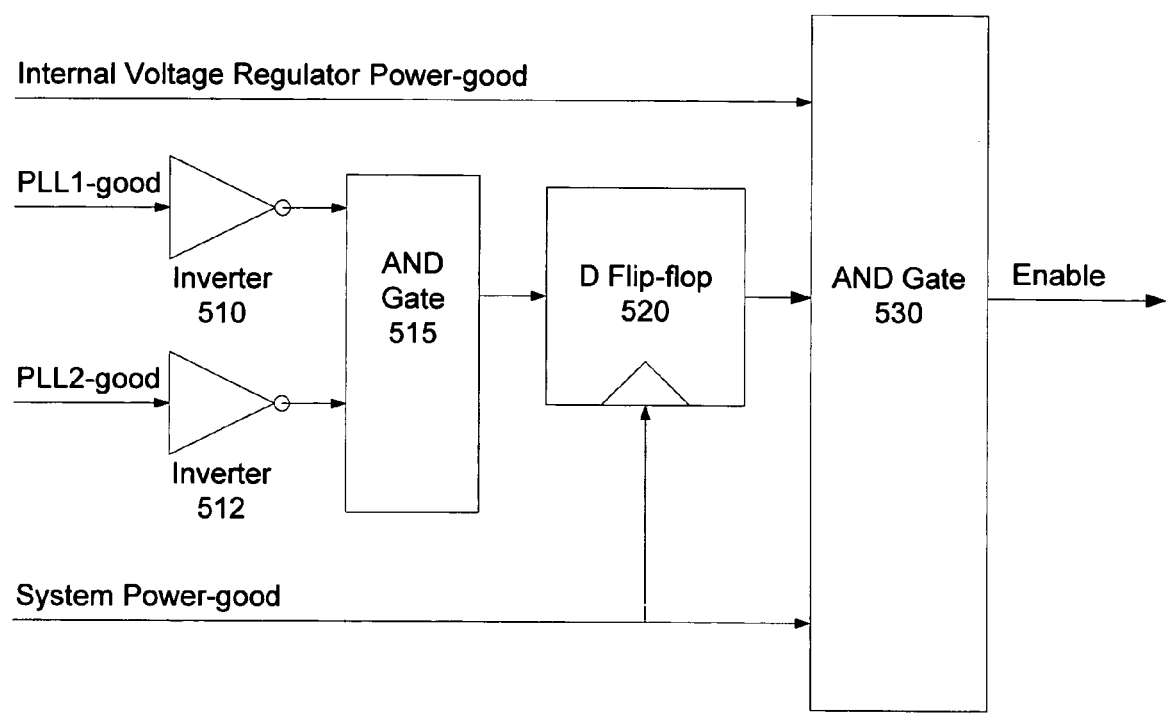
FIG. 5 is another embodiment of a dual mode detection logic circuit.

As shown in FIG. 5, the PLL1-good and PLL2-good signals are both inverted prior to being connected to AND gate 515. The PLL1-good signal is inverted by inverter 510, while the PLL2-good signal is inverted by inverter 512. If the processor 400 comprises more than two PLL's, each additionally generated PLL-good signal would also be coupled to the AND gate 515. The output of the AND gate 515 may be coupled to a D flip-flop. The D flip-flop is clocked by a system power-good signal that is generated by the system after a final power check after power-up. The system power-good signal and the output of the D flip-flop along with an internal voltage regulator power-good signal may be coupled to an AND gate 530. The internal voltage regulator power-good signal is asserted if the internal voltage regulator 450 is receiving a valid voltage source. The output generated by the AND gate 530 is used as an enable signal for the internal voltage regulator 450. In other words, the internal voltage regulator 450 is not enabled unless the internal voltage regulator 450 has a valid power supply, the system has properly powered up, and none of the PLL's on the processor chip 400 are powered by an external voltage regulator 410. If the internal voltage regulator 450 is enabled by the dual mode detection logic circuit 460, the internal voltage regulator 450 provides a voltage source to PLL1 420 and PLL2 425.

In the foregoing specification the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. A processor comprising:
   a logic circuit coupled to an internal voltage regulator to enable or disable the internal voltage regulator, wherein the logic circuit includes:
   a D flip-flop having a data input coupled to an external voltage signal, a clock input coupled to a system power signal, and an output, wherein the output is asserted if the external voltage signal is not providing a voltage; and
   an AND gate having a first input coupled to the output of the D flip-flop, a second input coupled to the system power signal, and an output, wherein the AND gate enables the internal voltage regulator if the output of the AND gate is asserted.

2. The processor of claim 1, wherein the AND gate comprises a third input coupled to a power good signal from the internal voltage regulator.

3. The processor of claim 1, further comprising
   a phased lock loop (PLL) coupled to the internal voltage regulator.

4. The processor of claim 3, wherein the PLL is coupled to the logic circuit and provides the external voltage signal.

5. The processor of claim 3, wherein the PLL provides the external voltage signal based on whether there is an external voltage regulator.

6. The processor of claim 5, wherein the internal voltage regulator powers the PLL if the internal voltage regulator is enabled by the logic circuit.

7. The processor of claim 3, further comprising:
   a second PLL coupled to the internal voltage regulator and the logic circuit.

8. The processor of claim 7, wherein the PLL provides a PLL good signal to the logic circuit and the second PLL provides a second PLL good signal to the logic circuit, and the logic circuit includes a second AND gate having a first input coupled to the PLL good signal and a second output coupled to the second PLL good signal.

9. The processor of claim 8, wherein the external voltage signal is provided to the D flip-flop by the second AND gate.

10. The processor of claim 1, wherein the logic circuit comprises an inverter.

* * * * *